(12) United States Patent
Burdy et al.

(10) Patent No.: US 7,442,875 B2
(45) Date of Patent: Oct. 28, 2008

(54) PROTECTIVE SHEATH WITH INTEGRAL BIASED FLAP CLOSURE

(75) Inventors: John Emerson Burdy, Morgantown, PA (US); Danny Edward Winters, Downingtown, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 73 days.

(21) Appl. No.: 11/375,326

(22) Filed: Mar. 14, 2006

(65) Prior Publication Data

US 2006/0201699 A1 Sep. 14, 2006

Related U.S. Application Data

(60) Provisional application No. 60/661,580, filed on Mar. 14, 2005.

(51) Int. Cl.
*H02G 15/08* (2006.01)
(52) U.S. Cl. .......................................................... 174/93
(58) Field of Classification Search .................. 174/93; 138/128, 166
See application file for complete search history.

(56) References Cited

U.S. PATENT DOCUMENTS

| | | | | |
|---|---|---|---|---|
| 2,118,634 | A | * | 5/1938 | Williams ..................... 206/104 |
| 2,320,940 | A | * | 6/1943 | Lipowitz ..................... 206/103 |
| 2,823,798 | A | * | 2/1958 | Volckening et al. ......... 229/221 |
| 3,270,866 | A | * | 9/1966 | Schoenberger .............. 206/112 |
| 3,649,398 | A | * | 3/1972 | Keith ........................... 156/79 |
| 4,002,194 | A | | 1/1977 | Wright, Sr. |
| 4,391,303 | A | * | 7/1983 | Holgersson .................. 138/166 |
| 4,588,321 | A | | 5/1986 | Egly |
| 4,788,088 | A | * | 11/1988 | Kohl ........................... 428/34.5 |
| 4,919,259 | A | | 4/1990 | Beaulieu |
| 4,929,478 | A | | 5/1990 | Conaghan et al. |
| 4,946,722 | A | | 8/1990 | Moyer |
| 4,970,353 | A | | 11/1990 | Kotz |
| 5,072,707 | A | | 12/1991 | Takai et al. |
| 5,217,770 | A | | 6/1993 | Morris, Jr. et al. |
| 5,229,176 | A | | 7/1993 | Freeman |
| 5,340,339 | A | | 8/1994 | Desai et al. |
| 5,367,123 | A | * | 11/1994 | Plummer et al. .............. 174/36 |
| 5,413,149 | A | | 5/1995 | Ford et al. |
| 5,613,522 | A | | 3/1997 | Ford et al. |
| 5,843,542 | A | | 12/1998 | Brushafer et al. |
| 5,899,239 | A | * | 5/1999 | Coulis ......................... 138/163 |
| 5,984,092 | A | | 11/1999 | Heard-Wilmon |
| 5,986,212 | A | | 11/1999 | Lhota |
| 6,087,593 | A | | 7/2000 | Skipworth et al. |
| 6,176,739 | B1 | | 1/2001 | Denlinger et al. |

(Continued)

*Primary Examiner*—Chau N Nguyen
(74) *Attorney, Agent, or Firm*—Robert L. Stearns; Dickinson Wright PLLC

(57) ABSTRACT

The invention provides a protective sheath for receiving elongated items. The protective sheath includes first and second elongated substrates connected to one another about at least one living hinge. The first and second elongated substrates are moveable relative to one another between an open configuration wherein the first and second substrates are positioned substantially side by side adjacent to one another and a closed configuration wherein the first and second substrates at least partially overlying one another. The protective sheath also includes a first flap attached to the first substrate along an edge. The first flap is resiliently biased into a position overlying the first substrate and operable to engage the second substrate when the first and second substrates are in the closed configuration.

11 Claims, 3 Drawing Sheets

U.S. PATENT DOCUMENTS

| | | |
|---|---|---|
| 6,227,251 B1 | 5/2001 | Ahn et al. |
| 6,227,709 B1 | 5/2001 | Lehmann et al. |
| 6,481,895 B2 | 11/2002 | Yang et al. |
| 6,576,841 B1 | 6/2003 | Brannan et al. |
| 6,583,352 B2 | 6/2003 | Fukushima et al. |
| 6,695,025 B1 | 2/2004 | Morehead |
| 6,878,873 B2 | 4/2005 | Fryberger, Jr. et al. |
| 6,963,031 B2 | 11/2005 | Gladfelter et al. |
| 2003/0221858 A1* | 12/2003 | James et al. .................. 174/93 |

* cited by examiner they will become more readily appreciated when considered in connection with the following detailed description and appended drawings, wherein:

US 7,442,875 B2

PROTECTIVE SHEATH WITH INTEGRAL BIASED FLAP CLOSURE

CROSS-REFERENCE TO RELATED APPLICATIONS

This application claims the benefit of U.S. Provisional Patent Application Ser. No. 60/661,580 for a PROTECTIVE SHEATH WITH INTEGRAL BIASED FLAP CLOSURE, filed on Mar. 14, 2005, which is hereby incorporated by reference in its entirety.

BACKGROUND OF THE INVENTION

1. Field of the Invention

This invention relates to protective sheathing for receiving elongated items, and especially to such sheathing having a closure integrally formed with the sheathing.

2. Description of Related Prior Art

Electrical wiring is used extensively in automotive applications, being routed through various compartments of the car, such as the passenger compartment, the trunk or along the inside of the roof, to provide electrical power to lights, radios, speakers or other electrical or electronic components within the automobile. It can be advantageous to encase elongated items such as wiring within a sheath which organizes and protects the wiring. Organizing the wiring is accomplished by capturing and grouping various wires within one or more sheaths. This avoids an unsightly tangle of wires within the automobile which can be inadvertently snagged and possibly severed or disengaged from a terminal. Organizing the wiring also allows for rapid identification of the wires, thereby providing for efficient troubleshooting and repairs. These are desirable characteristics as automotive electrical system problems tend to be difficult to diagnose and time consuming to repair.

The protection of wiring can also be desirable to prevent physical damage to both the wiring and its insulation due to abrasion and pinching. Abrasion of the wiring may be caused by vibration of the car structure due to rough engine operation and road roughness. The wiring responds to the vibration and nibs against a nearby portion of the chassis or body structure. Abrasion, as well as pinching, may be caused by physical contact of the wiring with passengers as they enter or exit the vehicle or with cargo as it is placed in the trunk. Pinching of a wire, for example, between a sharp edge on the chassis and the foot of a passenger can sever a wire, and abrasion of the wire by repeated rubbing motion against the chassis can cause a short circuit by wearing the insulation away and allowing the bare wire to contact a metal part of the chassis which is typically at negative electrical potential. Short circuits in the electrical system of an automobile usually lead to equipment failure, can cause a dead battery and may result in a serious fire.

In order to allow the wiring to pass within the various compartments of the automobile, it can be desired that the protective sheathing have a low profile, i.e., be substantially flat so as to fit unobtrusively between carpeting and the floor or side panel within the passenger compartment or trunk or between the roof and the roof lining. The sheathing should also be substantially stiff in a direction transverse to its width so as to be able to effectively capture and hold the wiring in place in a substantially flat configuration. At the same time, the sheathing should be relatively flexible transverse to its length so as to bend readily and follow contours of the automobile chassis.

Protective sheathing for elongated items should also be economical to produce, easy to incorporate into an existing layout or design and have reliable closure for manually sealing and unsealing the sheathing so that it can readily receive wiring and then securely capture and protect it. Protective sheaths currently in use have closure elements featuring fasteners such as hook and loop material, zippers, buttons or lacing for example.

SUMMARY OF THE INVENTION

The invention provides a protective sheath for receiving elongated items. The protective sheath includes first and second elongated substrates connected to one another about at least one living hinge. The first and second elongated substrates are moveable relative to one another between an open configuration wherein the first and second substrates are positioned substantially side by side adjacent to one another and a closed configuration wherein the first and second substrates at least partially overlying one another. The protective sheath also includes a first flap attached to the first substrate along an edge. The first flap is resiliently biased into a position overlying the first substrate and operable to engage the second substrate when the first and second substrates are in the closed configuration.

BRIEF DESCRIPTION OF THE DRAWINGS

Advantages of the present invention will become more readily appreciated when considered in connection with the following detailed description and appended drawings, wherein.

DETAILED DESCRIPTION OF THE PREFERRED EMBODIMENT

Figure 1:
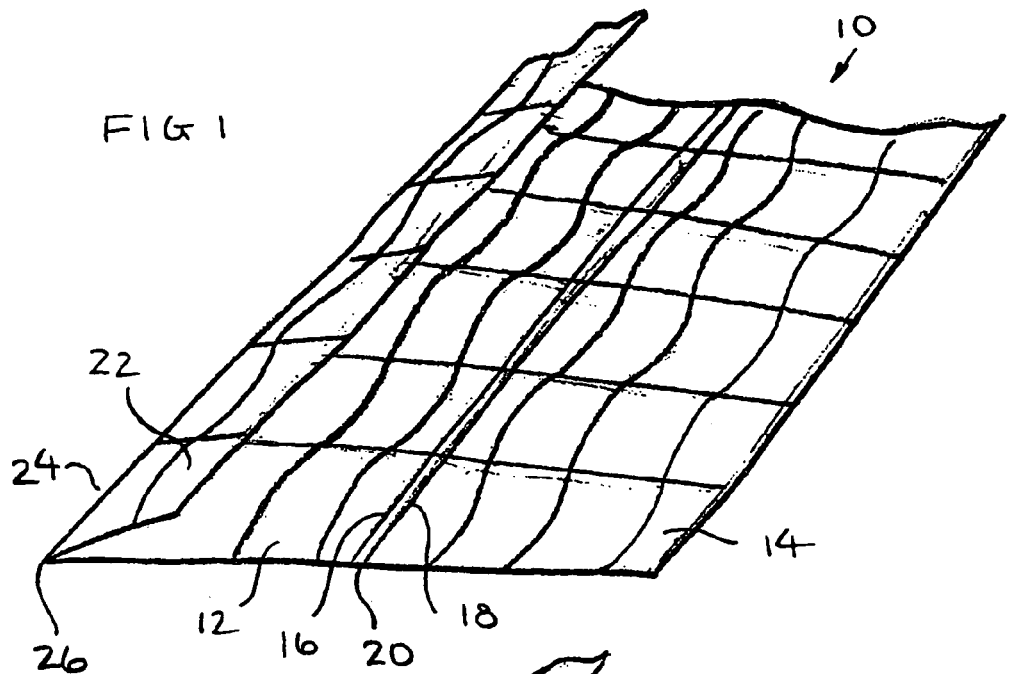
FIG. 1 is a perspective view of a protective sheath according to a first exemplary embodiment of the invention shown in an open configuration.

The invention concerns a protective sheath for receiving elongated items. The first exemplary sheath 10 includes a first elongated substrate 12 having a first edge 16 extending lengthwise therealong. A second elongated substrate 14 has a second edge 18 also extending lengthwise therealong. A first hinge 20 is attached to the first and second edges 16, 18 and joins the substrates 12, 14 to one another, the substrates 12, 14 being pivotably movable on the hinge 20 between an open configuration, wherein the substrates 12, 14 are positioned substantially side by side adjacent to one another, and a closed configuration wherein the substrates 12, 14 are in overlying relation. A flap 22 is attached to the first substrate 12, preferably by means of a second hinge 26. The flap 22 is resiliently biased into a position overlying the first substrate 12, and a portion of the second substrate 14 is positionable between the flap 22 and the first substrate 12 when the substrates 12, 14 are in the closed configuration. The flap 22 engages and holds the second substrate 14 in the closed position, the flap 22 being manually deformable or pivotably movable about the second hinge 26 to release the second substrate 14 from the closed configuration.

Preferably, the first and second substrates 12, 14 and the flap 22 are corrugated. The first and second substrates 12, 14 can have substantially the same width, although they may have different widths. In a preferred embodiment, the flap 22 extends substantially along the length of the first substrate 12. Preferably, the first and second hinges 20, 26 are living hinges.

In a second embodiment of the invention, a protective sheath 30 includes an elongated base substrate 32 having first and second opposite edges 76, 78 extending lengthwise therealong. An elongated first substrate 34 is hingedly attached to the base substrate 32 along the first edge 76. An elongated second substrate 36 is hingedly attached to the base substrate 32 along the second edge 78. The second substrate 36 is foldable into overlying relation with the base substrate 32 and the first substrate 34 is foldable into overlying relation with the second substrate 36. A first flap 42 is attached to the first substrate 34 and is resiliently biased into a position overlying the first substrate 34. Attachment of the first flap 42 to the first substrate 34 is preferably effected by means of a hinge 46. A second flap 48 is attached to the second substrate 36. Again, it is preferred to attach the flap 48 to the substrate 36 with a hinge 52. The second flap 48 is resiliently biased into a position overlying the second substrate 36. The first flap 42 is positionable between the second flap 48 and the second substrate 36 when the second substrate 36 is positioned between the first substrate 34 and the base substrate 32. Engagement of the flaps 42, 48 holds the first and second substrates 34, 36 in position overlying the base substrate 32.

In a third embodiment of the invention, a protective sheath 54 includes an elongated first substrate 56, an elongated second substrate 62 and a plurality of elongated intermediate substrates 58, 60 positioned between the first and second substrates 56, 62. The substrates 56-62 are positioned side by side adjacent to one another, and each of the substrates 56-62 is hingedly attached to an adjacent substrate 56-62. The substrates 56-62 are pivotably movable with respect to one another and positionable to surround and define a central space 70. A first flap 72 is attached to the first substrate 56 with a hinge 80. The first flap 72 is resiliently biased into a position overlying the first substrate 56. A second flap 74 is attached to the second substrate 62 with a hinge 82. The second flap 74 is resiliently biased into a position overlying the second substrate 62. The first flap 72 is positionable between the second flap 74 and the second substrate 62 when the substrates 56-62 are positioned surrounding the central space 70. Engagement of the flaps 72, 74 holds the substrates 56-62 in a position surrounding the central space 70.

FIG. 1 shows a perspective view of an elongated protective sheath 10 for receiving elongated items. Sheath 10 comprises the first and second substrates 12 and 14 having lengthwise adjacent edges 16 and 18 joined to one another by the hinge 20. The substrates 12, 14 are pivotably movable relative to one another about the hinge 20 between the open configuration shown in FIG. 1 where the substrates 12, 14 are positioned substantially side by side adjacent to one another, and the closed configuration shown in FIG. 2 where the substrates 12, 14 are in overlying relationship to one another. Preferably, hinge 20 is a living hinge integrally formed with the substrates 12, 14 and having a reduced section providing flexibility, allowing the substrates 12, 14 to pivot. Other types of hinges, such as a piano hinge, are also feasible.

The flap 22 is attached to substrate 12 along an edge 24 opposite to hinge 20. The flap 22 is attached to substrate 12 by means of the hinge 26 to provide flexibility. The hinge 26 is preferably a living hinge integrally formed with the substrate 12 and the flap 22. The flap 22 is biased into a positioned overlying the substrate 12. When substrate 14 is pivoted about hinge 20 into the closed configuration shown in FIG. 2, a portion of the substrate 14 is positioned between the flap 22 and the substrate 12. The biased flap 22 engages and holds substrate 14 in the closed configuration. When it is desired to pivot the substrates 12, 14 from the closed to the open configuration, the flap 22 is pivotable about hinge 26 to disengage it from contact with substrate 14 and release the substrate into the open configuration. In alternative embodiments of the invention, the flap could be readily manually deformable if a hinge is not present. Elongated items 28 such as, for example, a wiring harness or optical fibers, are captured and protected between the substrates 12 and 14.

Figure 2:
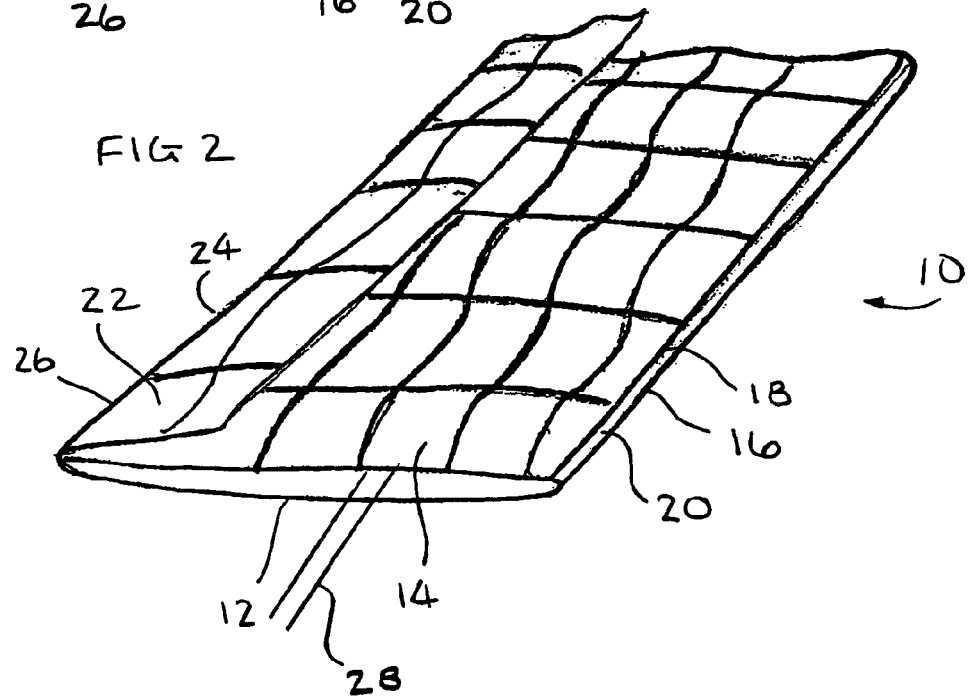
FIG. 2 is a perspective view of the protective sheath of FIG. 1 shown in a closed configuration.

The substrates 12 and 14 and flap 22 may be corrugated as shown to increase the rigidity of the sheath 10. Substrates 12 and 14 may have substantially the same width, as is shown in FIGS. 1 and 2, or the substrates 12, 14 may have different widths. The width of substrate 14 is constrained to practical dimensions that will enable it to be positioned between the flap 22 and the substrate 12 when the substrates 12, 14 are folded. This could, however, result in the width of the substrate 14 being either greater or less than the width of substrate 12. Preferably, flap 22 extends substantially continuously along the entire length of the substrate 12 as illustrated.

Figure 3:
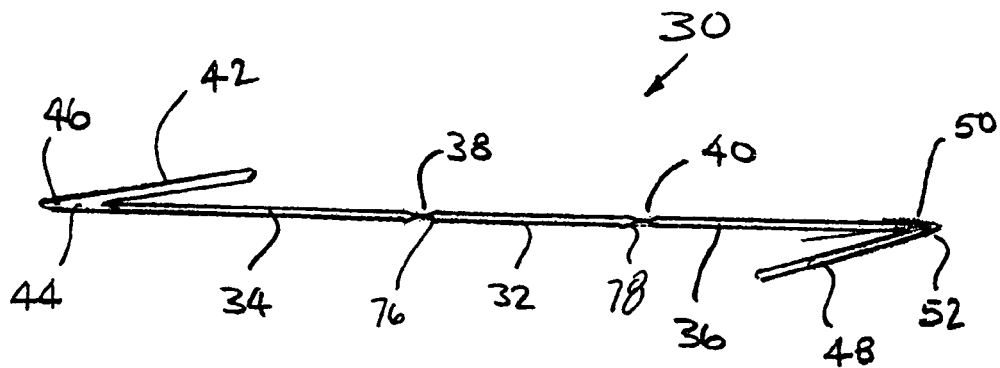
FIG. 3 is a cross-sectional view of a second embodiment of invention shown in an open configuration.
Figure 4:
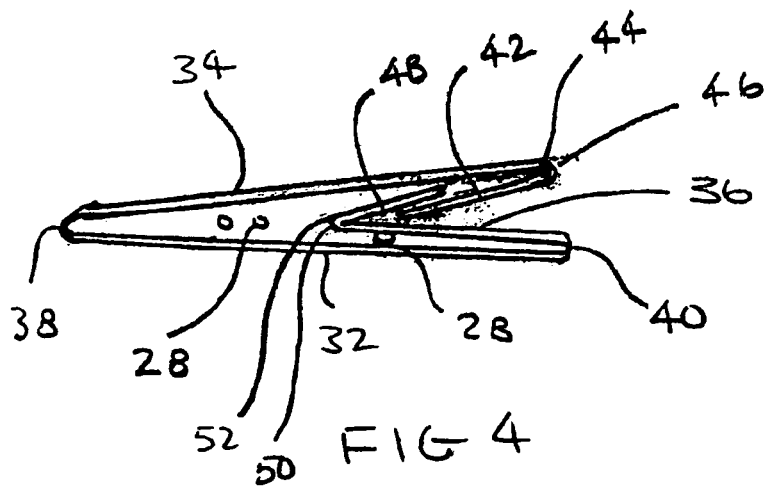
FIG. 4 is a cross-sectional view of the protective sheath of FIG. 3 shown in a closed configuration.

FIG. 3 shows the sheath 30 according to a second alternative embodiment of the invention. Sheath 30 comprises a base substrate 32 and first and second substrates 34 and 36, arranged lengthwise adjacent to the base substrate 32 and along opposite edges 76, 78. The first and second substrates 34 and 36 are attached to the opposite edges 76, 78 of the base substrate 32 by respective hinges 38 and 40. The second substrate 36 is foldable about hinge 40 into overlying relation with the base substrate 32 as shown in FIG. 4. Furthermore, the first substrate 34 is foldable about its hinge 38 into overlying relation with the second substrate 36. Elongated items 28 are captured between the base substrate 32 and the first and second substrates 34, 36 when they are in the folded or closed positioned shown in FIG. 4.

The first flap 42 is attached to the first substrate 34 along an edge 44 positioned opposite to hinge 38. The first flap 42 is biased into a position overlying the first substrate 34. The first flap 42 is preferably integrally formed with the first substrate 34 and the hinge 46 is preferably positioned between the flap 42 and the substrate 34 to allow the flap 42 to pivot flexibly relatively to the substrate 34. In the absence of the hinge 46, the flap 42 could be flexible and deformable. Similarly, the second flap 48 is attached to the second substrate 36 along an edge 50 positioned opposite to the hinge 40. The second flap 48 is biased into a position overlying second substrate 36, but is positioned on the opposite side of the substrate 36 from that of first flap 42. The second flap 48 is preferably integrally formed with a second substrate 36. A hinge 52 is present between the flap 48 and the substrate 36 and allows the second flap 48 to pivot flexibly relatively to the substrate 36.

By biasing the first and second flaps 42 and 48 to opposite sides of their respective substrates 34 and 36, it is possible, as shown in FIG. 4, to insert the first flap 42 between the second flap 48 and the second substrate 36 when the second substrate 36 is folded into overlying relation with the base substrate 32 and the first substrate 34 is folded into overlying relation with the second substrate 36. Engagement of the first and second flaps 42, 48 in this manner provides an effective closure that is integrally formed with the substrates 34, 36 of the sheath 30.

Figure 5:
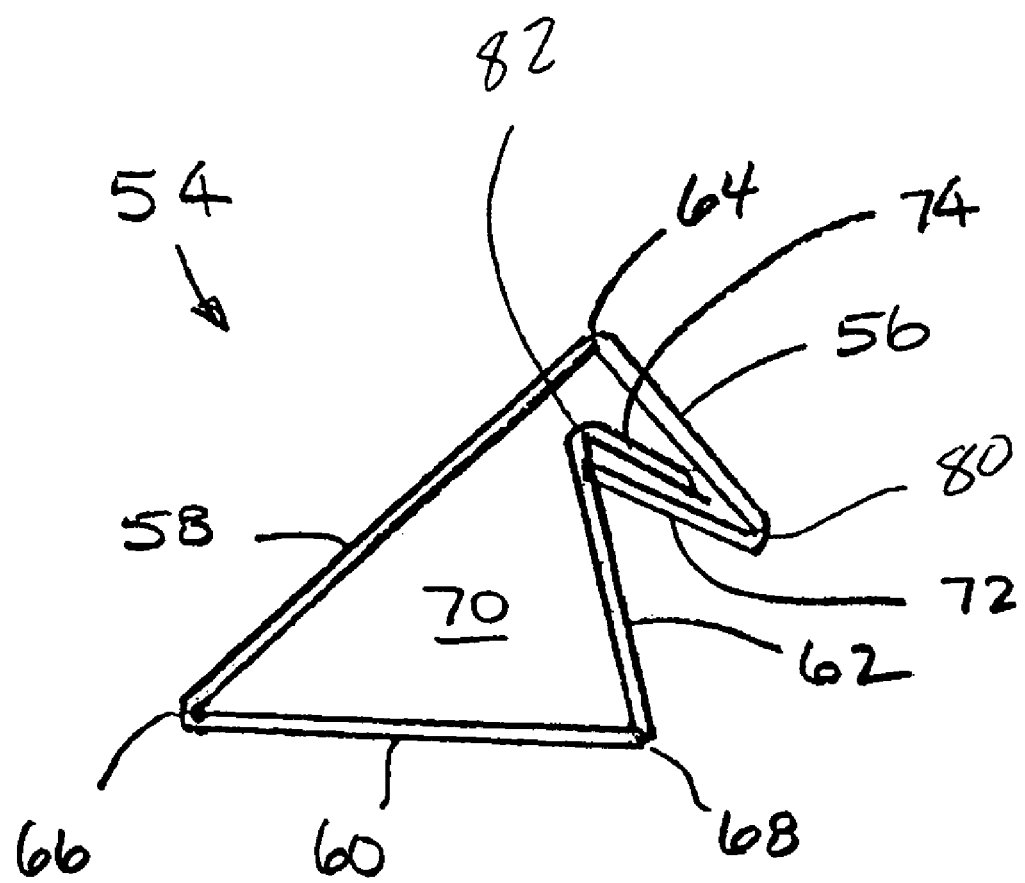
FIG. 5 is a cross-sectional view of a third embodiment of the invention shown in a closed configuration.

FIG. 5 shows the protective sheath 54 according to the third embodiment of the invention. The sheath 54 is formed from a plurality of substrates 56, 58, 60 and 62 hingedly attached to one another along adjacent edges. Hinges 64, 66, and 68 join the substrates 52-60 to one another and are preferably living hinges that are integrally formed with the substrates 52-60. The hinges 64-68 allow the substrates 52-60 to be pivoted relative to one another and surround a central space 70 for receiving the elongated items.

Each outermost substrate 56 and 62 is attached to one of the flaps 72 and 74. The flaps 72, 74 are biased into a position overlying the adjacent substrate 56, 62, respectively. The flaps 72 and 74 are biased to overlie opposite sides of the respective substrates 56, 62. This biasing configuration allows the first flap 72 to be inserted between the second flap 74 and the substrate 62 when the substrates 56-62 are pivoted so as to surround and define the central space 70. The exemplary flap 74 is positioned between flap 72 and the substrate 56. The flaps 72 and 74 define an effective closure that maintains the substrates 56-62 in the pivoted configuration until it is desired to open the sheath 54 and gain access to the central space 70. Preferably, the flaps 72 and 74 are hingedly connected to the respective substrates 56 and 62 so that the flaps 72, 74 may be readily pivoted manually to effect opening and closing of the sheath 54. In the absence of hinges, the flaps 72, 74 could be flexible and resiliently deformable to allow the flaps 72, 74 to be readily engaged and disengaged. Although sheath 54 is shown having a generally triangular cross-sectional shape, virtually any geometrical cross-sectional shape may be obtained by selecting an appropriate number of substrates and the location of the hinges connecting them.

Protective sheaths according to embodiments of the invention can be formed from flexible, resilient polymer sheet materials such as polypropylene, polyester, nylon and other materials that allow the characteristic living hinges and corrugations to be readily formed upon extrusion through heated dies and passing between heated rollers having surfaces configured to emboss corrugations, hinges and the like onto a unitary blank from which the sheath may be formed. Materials selected for forming embodiments of the invention can also be resiliently flexible and easily biased into various shapes, such that the formed sheaths lend themselves well to the inexpensive manufacture.

Embodiments of the invention may be formed from interlaced polymer monofilaments which are heat settable for biasing the sheath into the closed configuration. Such sheaths would be preferably woven from polyester or nylon filaments.

Protective sheaths having integrally formed closures as described above eliminate the need to attach separate closure means, such as hook and loop fasteners, zippers, lacing, buttons and the like to provide a closure system. The biased flap closures according to the invention reliably maintain the sheath in a close positioned, while allowing the sheath to be opened manually for access to the central space receiving the elongated items.

Obviously, many modifications and variations of the present invention are possible in light of the above teachings. It is, therefore, to be understood that within the scope of the appended claims, the invention may be practiced otherwise than as specifically described.

What is claimed is:

1. A protective sheath for receiving elongated items comprising:

first and second elongated substrates connected to one another by a living hinge for relative movement between an open configuration wherein said first and second substrates are positioned substantially side by side adjacent to one another and a closed configuration wherein said first and second substrates overlie one another in a generally flat configuration;

a first flap attached to said first substrate along an edge opposite said living hinge, said first flap being resiliently biased in overlying relation to said first substrate and engaging said second substrate when said first and second substrates are in said closed configuration wherein at least a portion of said second substrate is sandwiched between said first flap and said first substrate, said first flap resisting movement of said second substrate from said closed configuration and maintaining said second substrate in said closed configuration without aid of a fastener by engaging and holding said second substrate between said first substrate and said flap under said bias, said flap being resiliently deformable against said bias under an externally applied force to selectively release said second substrate from said closed configuration; and a second living hinge connecting said first flap and said first substrate to one another, wherein said first and second substrates and said first flap and said living hinges are further defined as being unitary and integrally formed from flexible, resilient polymer sheet materials selected from the group consisting of polypropylene, polyester, and nylon.

2. The protective sheath of claim 1 wherein said first and second elongated substrates are further defined as being immediately adjacent to one another.

3. The protective sheath of claim 1 wherein said flap is further defined as indirectly engaging said second substrate when said first and second substrates are in said closed configuration.

4. The protective sheath of claim 1 wherein said first and second substrates are further defined as having substantially the same width.

5. The protective sheath of claim 1 wherein said flap is further defined as extending substantially along an entire length of said first substrate.

6. The protective sheath of claim 1 wherein said first and second substrates and said first flap are further defined as being formed from interlaced polymer monofilaments.

7. The protective sheath of claim 6 wherein said first and second substrates and said first flap are further defined as being woven from one of polyester and nylon filaments.

8. A protective sheath for receiving elongated items comprising:

first and second elongated substrates connected to one another about at least one living hinge for relative movement between an open configuration wherein said first and second substrates are positioned substantially side by side adjacent to one another and a closed configuration wherein said first and second substrates at least partially overlying one another;

a first flap attached to said first substrate along an edge and resiliently biased into a position overlying said first substrate and operable to engage said second substrate when said first and second substrates are in said closed configuration for limiting movement of said second substrate from said closed configuration and being resiliently deformable to release said second substrate from said closed configuration;

another living hinge connecting said first flap and said first substrate to one another, wherein said first and second substrates and said first flap and said living hinges are further defined as being unitary and integrally formed from flexible, resilient polymer sheet materials selected from the group consisting of polypropylene, polyester, and nylon;

at least one intermediate substrate disposed between said first and second substrates; and wherein said at least one intermediate substrate further comprises:

a first intermediate substrate disposed between said first and second substrates; and a second intermediate substrate disposed between said first substrate and said first intermediate substrates.

9. The protective sheath of claim 8 wherein said at least one intermediate substrate is further defined as being narrower than at least one of said first and second substrates.

10. The protective sheath of claim 8 wherein said at least one living hinge further comprises:

a first living hinge disposed between said first intermediate substrate and said first substrate;

a second living hinge disposed between said first intermediate substrate and said second intermediate substrate; and a third living hinge disposed between said second intermediate substrate and said second substrate.

11. A protective sheath for receiving elongated items comprising:

first and second elongated substrates connected to one another about at least one living hinge for relative movement between an open configuration wherein said first and second substrates are positioned substantially side by side adjacent to one another and a closed configuration wherein said first and second substrates at least partially overlying one another;

a first flap attached to said first substrate along an edge and resiliently biased into a position overlying said first substrate and operable to engage said second substrate when said first and second substrates are in said closed configuration for limiting movement of said second substrate from said closed configuration and being resiliently deformable to release said second substrate from said closed configuration;

a second living hinge connecting said first flap and said first substrate to one another, wherein said first and second substrates and said first flap and said living hinges are further defined as being unitary and integrally formed from flexible, resilient polymer sheet materials selected from the group consisting of polypropylene, polyester, and nylon; and a second flap resiliently biased into a position overlying said second substrate wherein at least a portion of said second flap is positionable between said first flap and said first substrate when said first and second substrates are in said closed configuration.

* * * * *

UNITED STATES PATENT AND TRADEMARK OFFICE
CERTIFICATE OF CORRECTION

| | |
|---|---|
| PATENT NO. | : 7,442,875 B2 |
| APPLICATION NO. | : 11/375326 |
| DATED | : October 28, 2008 |
| INVENTOR(S) | : John Emerson Burdy et al. |

Page 1 of 1

It is certified that error appears in the above-identified patent and that said Letters Patent is hereby corrected as shown below:

Column 1, line 43:  "nibs against a nearby portion" should be --rubs against a nearby portion--

Signed and Sealed this

Third Day of March, 2009

JOHN DOLL
*Acting Director of the United States Patent and Trademark Office*